United States Statutory Invention Registration [19]

[11] Reg. Number: H450

Halbach [43] Published: Mar. 1, 1988

[54] MAGNETIC FIELD ADJUSTMENT STRUCTURE AND METHOD FOR A TAPERED WIGGLER

[75] Inventor: Klaus Halbach, Berkeley, Calif.

[73] Assignee: The United States of America as represented by the United States Department of Energy, Washington, D.C.

[21] Appl. No.: 19,728

[22] Filed: Feb. 27, 1987

[51] Int. Cl.[4] ..... H01S 1/00; H01J 25/00

[52] U.S. Cl. ..... 330/4; 315/4

[56] References Cited

U.S. PATENT DOCUMENTS

| | | |
|---|---|---|
| 2,520,383 | 8/1950 | Craig . |
| 2,812,470 | 11/1957 | Cook et al. . |
| 3,300,728 | 1/1967 | Adler . |
| 3,665,242 | 5/1972 | Dubravec . |
| 3,822,410 | 7/1974 | Madey . |
| 4,283,687 | 8/1981 | Madey et al. . |
| 4,323,857 | 4/1982 | Bran et al. . |
| 4,425,649 | 1/1984 | Elias et al. . |
| 4,461,004 | 7/1984 | Madey . |
| 4,466,101 | 8/1984 | Schoen . |
| 4,479,219 | 10/1984 | Madey . |
| 4,500,843 | 2/1985 | Szoke et al. . |
| 4,506,229 | 3/1985 | Prosnitz et al. . |
| 4,542,510 | 9/1985 | Black, Jr. . |

OTHER PUBLICATIONS

Halbach, Klaus, "Application of Permanent Magets in Accelerators and Electron Storage Rings," *Journal of Applied Physics,* vol. 57, No. 8, part IIA, 15 Apr. 1985, pp. 3605–3608.

Halbach, Klaus, "Concepts for Insertion Devices That Will Produce High-Quality Synchrotron Radiation," Internat'l Conf. on X-ray and VUV Synchrotron Radiation Instrumentation, 29 Jul.–2 Aug. '85, Stanford, CA.

Halbach, Klaus, "Desirable Excitation Patterns for Tapered Wigglers," DOE Technical Report No. LBL-20564, Lawrence Berkeley Laboratory, Univ. of California, Nov. '85.

*Primary Examiner*—Stephen C. Buczinski
*Assistant Examiner*—Linda J. Wallace
*Attorney, Agent, or Firm*—Clifton E. Clouse, Jr.; Roger S. Gaither; Judson R. Hightower

[57] ABSTRACT

An improved method and structure is disclosed for adjusting the magnetic field generated by a group of electromagnet poles spaced along the path of a charged particle beam to compensate for energy losses in the charged particles which comprises providing more than one winding on at least some of the electromagnet poles; connecting one respective winding on each of several consecutive adjacent electromagnet poles to a first power supply, and the other respective winding on the electromagnet pole to a different power supply in staggered order; and independently adjusting one power supply to independently vary the current in one winding on each electromagnet pole in a group whereby the magnetic field strength of each of a group of electromagnet poles may be changed in smaller increments.

18 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MAGNETIC FIELD ADJUSTMENT STRUCTURE AND METHOD FOR A TAPERED WIGGLER

The invention described herein arose in the course of, or under, Contract No. DE-AC03-76SF00098 between the U.S. Department of Energy and the University of California.

BACKGROUND OF THE INVENTION

Electromagnetic radiation ranging from the infrared to the hard X-ray region is produced when electrons pass a series of magnetic fields of alternating polarity. Such an arrangement, termed a wiggler or undulator, consists of a series of opposed pairs of magnetic poles arranged to have alternate magnetic field direction between adjacent pole pairs. Charged particles such as electrons, moving in a magnetic field, experience a force perpendicular to both the magnetic field and velocity vectors. In response to the force, the electrons are accelerated in a transverse direction, and because of the alternating polarity of the magnetic poles, that direction is periodically reversed, causing the electrons to wiggle as they pass by the series of magnet poles. Such a typical wiggler, constructed using permanent magnet poles, is described on page 3607 of my article entitled "APPLICATION OF PERMANENT MAGNETS IN ACCELERATORS AND ELECTRON STORAGE RINGS" published in the Journal of Applied Physics, Volume 57, No. 8, Part IIA on Apr. 15, 1985. Prosnitz et al U.S. Pat. No. 4,506,229 also describes a Free Electron Laser using a transverse wiggler magnetic field.

The transverse acceleration of the electrons produdes electromagnetic radiation whose wavelength depends on the electron energy, the spacing between wiggler magnets, the magnetic field strength, and other factors. If the electron energy is extremely high, the radiation wavelength can be in the vacuum ultraviolet or even the X-ray region. The intensity of the light depends on the number of poles of the wiggler, so that longer and longer wigglers are being contemplated having as many as 2500 magnets. The energy of the emitted light is obtained at the expense of the energy of the electrons, resulting in a reduction in their mass, the reduction in electron velocity being negligible.

This reduction in mass is negligible unless the electron beam is bunched in such a way that the emitted radiation power is many orders of magnitude larger than it is for an unbunched beam. Under these circumstances, one talks of a Free Electron Laser or a transverse optical klystron.

When the reduction in electron mass is substantial, it is necessary to use a tapered wiggler, i.e , one in which the magnetic field strength of successive magnets is gradually decreased to maintain the relationship between wiggler period, magnetic field, and wavelength of emitted light. A tapered wiggler structure is shown, for example, in Madey et al U.S. Pat. No. 4,283,687.

While tapered wigglers are designed to adjust the field strength of the electromagnet poles of the undulator, it is necessary to accomplish this without causing steering or displacement problems.

Madey U.S. Pat. Nos. 4,461,004 and 4,479,219 disclose adjustment of the relative excitation of electromagnet poles in a free electron laser system using associated windings on magnet segments. Adler U.S. Pat. No. 3,300,728 discusses changing of the field strength of electromagnets in a cyclotron using aiding or bucking windings.

SUMMARY OF THE INVENTION

I have discovered that the adjustment of the field strength of a series of electromagnet poles in a wiggler or undulator may be accomplished as a unit to reduce the problems of steering and displacement as well as variations in excitations of individual magnet poles differs from the ideal due to iron saturation of the cores of the magnet poles. The adjustment is accomplished using multiple windings on all or most of the magnet poles with the separate windings connected to different power supplies. More particularly, the control is accomplished by arranging the distribution of turns on the windings on adjacent magnet poles in accordance with a binomial pattern to form the desired tapered wiggler or undulator.

It is, therefore, an object of this invention to provide an improved magnetic field adjustment system for a tapered wiggler.

It is another object of this invention to provide an improved magnetic field adjustment system for a tapered wiggler using a series of power supplies connected to coils of electromagnet poles along the beam path.

It is yet another object of this invention to provide an improved magnetic field adjustment system for a tapered wiggler using a series of power supplies connected to coils of electromagnet poles along the beam path wherein all or most of the electromagnet poles are provided with more than one winding and each winding on a particular electromagnet pole is connected to a different power supply from the other winding on the same pole.

It is a further object of this invention to provide an improved magnetic field adjustment system for a tapered wiggler wherein all or most of the electromagnet poles are provided with a plurality of windings, one winding on each of a plurality of adjacent poles is connected to a single power supply, and the number of turns on the windings of adjacent electromagnet poles connected to the same power supply varies in accordance with a binomial series.

It is yet a further object of this invention to provide an improved magnetic field adjustment system for a tapered wiggler wherein all or most of the electromagnet poles are provided with a plurality of windings, one winding on each of a plurality of adjacent electromagnet poles is connected to a single power supply, the number of turns on the adjacent windings connected to the said power supply varies in accordance with a binomial series, and other power supplies are connected in staggered fashion to other sets of windings on adjacent groups of electromagnet poles in the wiggler.

These and other objects of the invention will be apparent from the following description and accompanying drawings.

In accordance with the invention, an improved system is provided for adjusting the magnetic field generated by a group of electromagnet poles spaced along the path of a charged particle beam to compensate for energy losses in the charged particles which comprises providing more than one winding on all or most of the electromagnet poles, connecting one winding on each electromagnet pole in the group to a first power supply, and another winding on each electromagnet pole in the group respectively to one or more other power supplies, and independently adjusting one power supply to independently vary the current in one winding of each electromagnet pole in the group whereby the magnetic field strength of the electromagnet poles in the group may be changed in smaller increments.

DETAILED DESCRIPTION OF THE INVENTION

The invention provides a method and structure for adjusting the field strength of groups of electromagnet poles in a tapered wiggler, using only one current control for each group. As the electrons pass between the opposed N-S poles of a wiggler, the energy of the light produced is at the expense of the energy of the electrons, in the form of a decrease in their mass, requiring compensation in the form of gradually changed field strength of the magnet poles of the wiggler.

Such a system, called a tapered wiggler, is necessary to maintain the relationship between the period of the wiggler, the field strength, and the radiation wavelength. An effective method and structure has been found for controlling the field strength of groups of electromagnet poles along an electron beam path to maintain the average path of the electrons along the z axis and prevent them from wandering to the side. In this system, the field strength of succeeding magnet pole groups may be adjusted by a single current control which will adjust a series of adjacent electromagnet poles in each group.

In accordance with the invention, all or at least most of the electromagnet poles of the tapered wiggler are each provided with more than one winding, with each winding on a electromagnet pole energized by a different power supply, i.e., if the electromagnet pole has two windings, one winding is energized by a first power supply and the other winding is energized by another power supply. The total number of turns on the combined windings on each electromagnet pole is, however, in accordance with a preferred embodiment of the invention, the same as the total number of turns on adjacent magnet poles.

The number of turns on a particular winding on each electromagnet pole on an adjacent group of magnet poles energized by the same power supply is, however, varied, in accordance with the invention, using a binomial pattern. The order of the binomial pattern used for the adjustment of field strength will depend upon how rapidly the energy changes over all the poles which are affected by an individual power supply.

Figure 1:
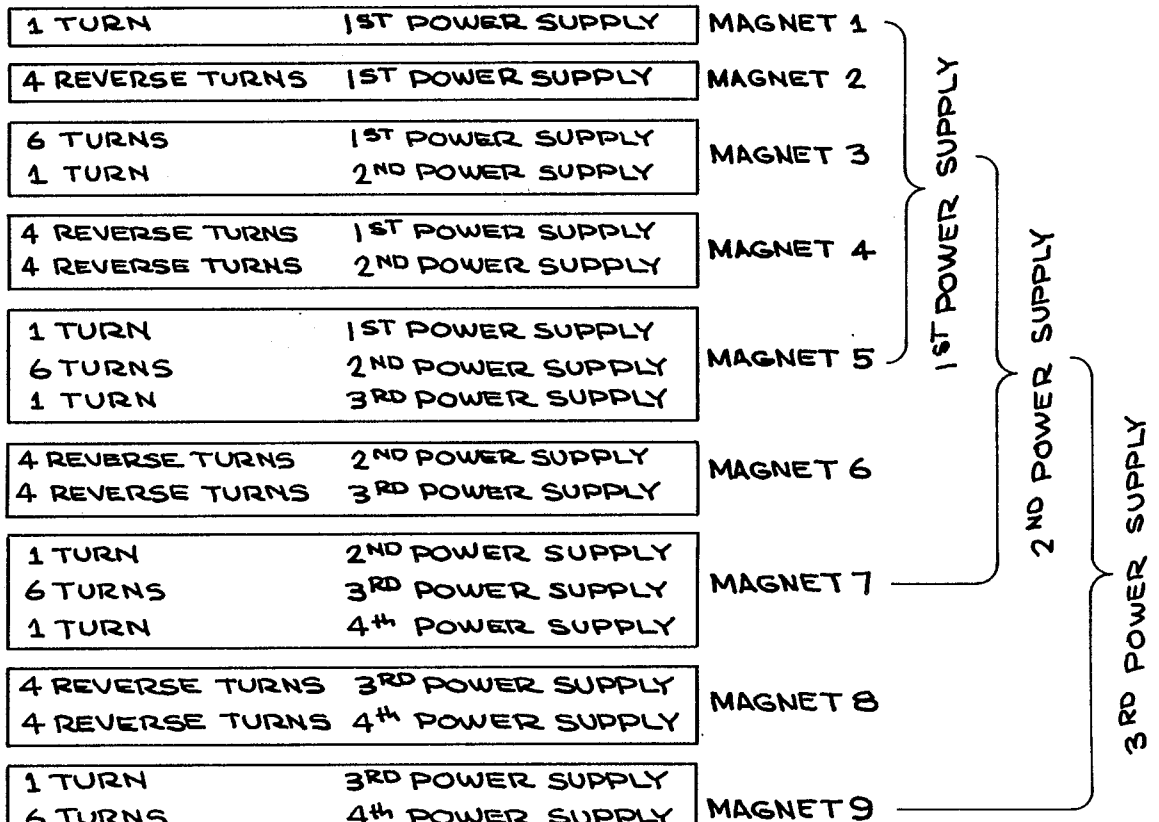
FIG. 1 is a diagramatic illustration showing the relationship between a series of power supplies and a group of adjacent electromagnet poles along the beam path.
Figure 2:
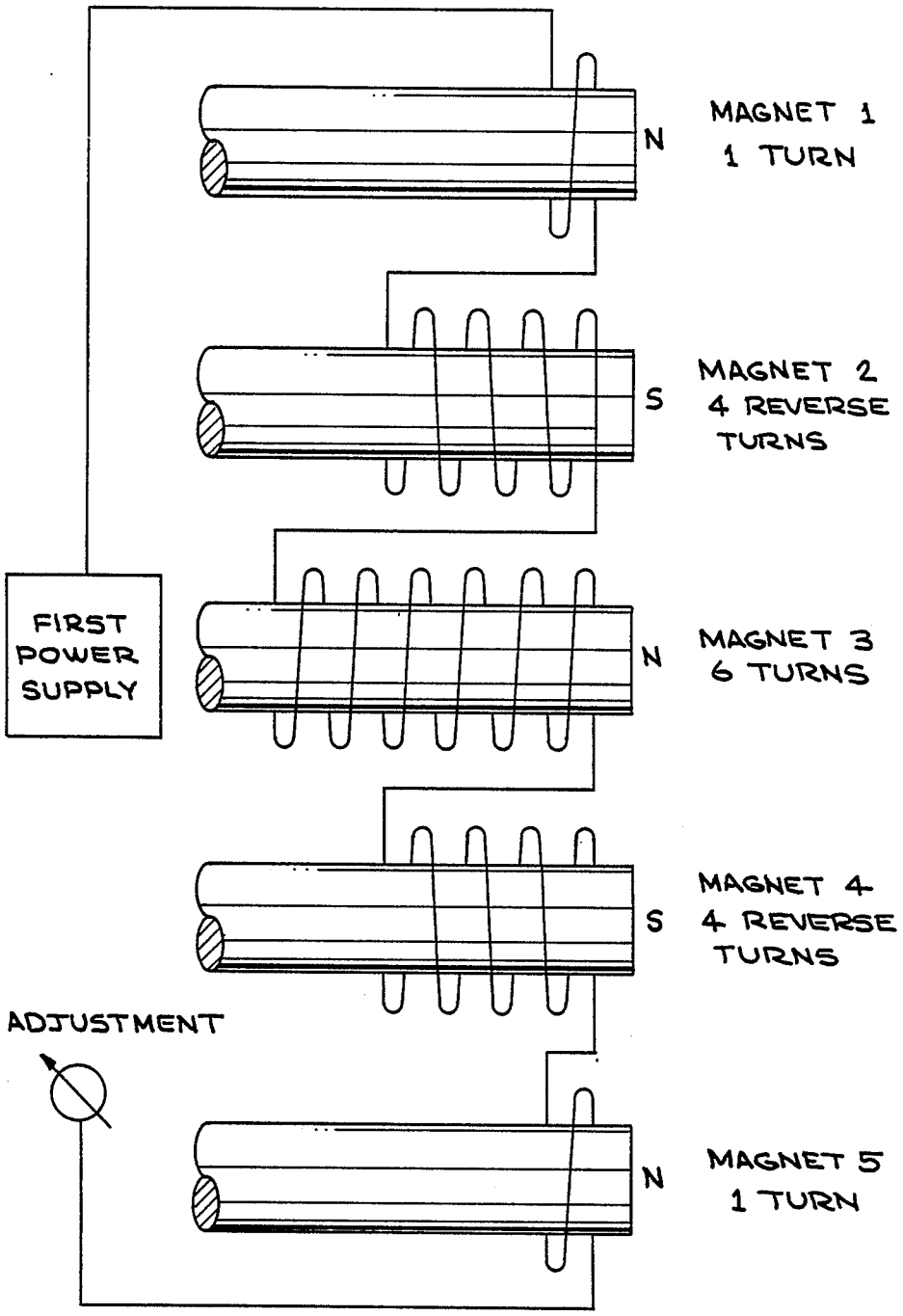
FIG. 2 is a pictorial view of the windings on each electromagnet pole of a group of adjacent electromagnet poles connected to one of the power supplies.

In the preferred embodiment which is illustrated, a binomial pattern of order 4 is used for the number of turns on adjacent magnet poles connected in series to the same power supply with a common adjustment as shown in FIG. 2. It will, however, be appreciated that in some applications of the concepts of this invention, the use of either a higher or lower order binomial pattern may be more appropriate. By using two or more windings on each electromagnet pole and staggering the power supplies attached to the respective windings, groups of adjacent electromagnet poles can be energized, as shown in Table I and in FIG. 1.

In Table I, and as also depicted in FIG. 1, each electromagnet pole (except for the first three) is illustrated as having a total of eight turns (although multiples could also be used). Ignoring the first three magnet poles which may be thought of as special cases, it will be seen that commencing with magnet pole 4, four turns on each of two windings wound in the same direction are connected respectively to the first and second power supply, while magnet pole 5 has a one turn winding connected to the first power supply, a six turn winding connected to the second power supply and a one turn winding attached to the third power supply. All of the windings on magnet pole 5 are wound in the same direction on that magnet pole, but opposite to the direction of the windings on magnet pole 4 to provide the desired reversed magnetic field or wiggler effect.

TABLE I

| Power Supply No. | Number Of Turns Of Each Winding On Each Magnet — Magnet Number 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 1 | 1 | −4 | 6 | −4 | 1 | | | | | | | | | | | | |
| 2 | | | 1 | −4 | 6 | −4 | 1 | | | | | | | | | | |
| 3 | | | | | 1 | −4 | 6 | −4 | 1 | | | | | | | | |
| 4 | | | | | | | 1 | −4 | 6 | −4 | 1 | | | | | | |
| 5 | | | | | | | | | 1 | −4 | 6 | −4 | 1 | | | | |
| 6 | | | | | | | | | | | 1 | −4 | 6 | −4 | 1 | | |
| 7 | | | | | | | | | | | | | 1 | −4 | 6 | −4 | 1 |

Adjustment then of any one of the power supplies, as shown in FIG. 2, results in an adjustment of the respective field strengths of a group of five adjacent electromagnet poles each having one winding in series with one winding on adjacent magnet poles and with that power supply. Thus, a profile is formed which has been found to provide the necessary adjustment for changes in the energy of the electrons without providing such a radical adjustment change as might occur, for example, if the entire adjustment was carried out over a space of only two adjacent magnet poles.

It should be noted that while FIGS. 1 and 2 illustrate the turns on each winding of one pole of adjacent magnet poles, it will be appreciated that the illustrations are only fragmentary and that in the actual construction of a device employing the concepts of the invention, for each illustrated magnet pole there would be a corresponding pole of opposite polarity on the other side of the beam path which together form a pole pair, i.e., a pair of opposing NS poles located on opposite sides of the beam path.

Furthermore, the particular shape of the core is illustrative only and the only limitation on the shape of the iron structure used in forming the magnet poles on both sides of the beam path is that it must be such that the scalar potential of each pole tip is controlled by the number of ampere turns on the core.

It will also be noted that, in accordance with the invention, the respective power supplies are connected in staggered fashion to the respective windings on each magnet pole with connections to a new power supply starting two magnet poles apart corresponding to one complete period of magnetic field reversal.

More or less the same effect can be obtained with the use of half the number of power supplies by staggering connections between the power supplies and the windings two periods apart with the number of turns per winding calculated by combining the windings connected to the first two power supplies and subsequent pairs of power supplies of Table I, as shown in Table II.

In this instance it will be seen that every fourth electromagnet pole is only provided with one set of windings while the adjacent magnet poles each have two windings.

While the embodiment shown in Table II requires less power supplies and less adjustments of magnet pole groups, the amount of overlap between adjacent magnet pole groups is also reduced which results in wider swings in the magnetic fields when a particular power supply is adjusted. Adjustment of each power supply in the embodiment shown in Table I and FIGS. 1 and 2 should result in more precise control of the amount of change in the excitation energy imparted to the electron beam by the electromagnet coils.

TABLE II

| Power Supply No. | Number Of Turns Of Each Winding On Each Magnet — Magnet Number 1 | 2 | 3 | 4 | 5 | 6 | 7 | 8 | 9 | 10 | 11 | 12 | 13 | 14 | 15 | 16 | 17 | |
|---|---|---|---|---|---|---|---|---|---|---|---|---|---|---|---|---|---|---|
| 1 | 1 | −4 | 7 | −8 | 7 | −4 | 1 | | | | | | | | | | | |
| 2 | | | | | 1 | −4 | 7 | −8 | 7 | −4 | 1 | | | | | | | |
| 3 | | | | | | | | | 1 | −4 | 7 | −8 | 7 | −4 | 1 | | | |
| 4 | | | | | | | | | | | | | 1 | −4 | 7 | 8 | 7 | −4 |
| 5 | | | | | | | | | | | | | | | | | 1 | −4 |

While the first three magnet poles in the series in either Tables I or II are not shown as having the same number of coils or turns as subsequent magnet poles, these magnet poles may be thought of as having more than one winding, just as every other magnet pole, and therefore having the same total number of turns as all other magnet poles, with the additional winding connected to a power supply with zero current. Occasionally, one or more of the magnet poles in the middle of the wiggler may be similarly provided with only one energized winding if a particular adjustment need exists which necessitates this. However, it should be pointed out that typical wigglers in which the invention may be employed may comprise as many as 2500 adjacent electromagnet poles, i.e., pairs of opposed magnet poles of opposite polarity; and, therefore, any such cases should be deemed to be exceptions.

Nevertheless, since such cases do exist, expressions will be used herein such as "providing more than one winding on some of said electromagnet poles" and "generally providing two windings on each of said electromagnet poles" in recognition of the fact that not all of the magnet poles will necessarily have more than one winding even though a vast majority of the poles will be so provided.

It should also be noted that while Tables I and II respectively only show the turns for each winding on the first seventeen or eighteen magnet poles, and FIGS. 1 and 2 respectively only illustrate the number of windings and power supplies associated with nine magnet poles (FIG. 1) or five magnet poles (FIG. 2), such patterns are repeated along the entire length of the wiggler, i.e., for as many as 2500 or more adjacent magnet poles.

Thus, the invention provides a method and apparatus for adjusting the field strength of electromagnet poles in a tapered wiggler in response to loss of energy in the electrons in the beam. The adjustment comprises the independent adjustment of power supplies connected to one winding of a group of adjacent electromagnet poles in the wiggler where in the number of turns on each electromagnet pole in the group varies in accordance with a binomial series, preferably of fourth order. In this manner, the adjustment or compensation may be made while minimizing cumulative displacement and steering errors of the electron trajectory.

While a specific embodiment of the improved magnetic field adjustment structure and method has been illustrated and described in accordance with this invention, modifications and changes of the apparatus, parameters, materials, etc. will become apparent to those skilled in the art, and it is intended to cover in the appended claims all such modifications and changes which come within the scope of the invention.

What is claimed is:

1. An improved method for adjusting the magnetic field in a wiggler generated by electromagnet poles spaced along the path of a charged particle beam to compensate for energy losses in the charged particles which comprises:

(a) providing more than one winding on at least some of said electromagnet poles;

(b) connecting one of said windings on each of a group of adjacent electromagnet poles to a first power supply, and another winding on electromagnet poles having more than one winding to a second power supply; and (c) independently adjusting one power supply to independently vary the current in one of said windings on a group of adjacent electromagnet poles;

whereby the magnetic field strength of a group of adjacent electromagnet poles in a wiggler may be changed in smaller increments without causing net angular deflection or lateral displacement of the beam.

2. The method of claim 1 wherein said step of connecting said first power supply to one winding of each of a group of adjacent electromagnet poles further includes connecting said first power supply in series with said respective windings of each of a series of adjacent electromagnet poles.

3. The method of claim 2 wherein said step of providing more than one winding on at least some of a series of adjacent electromagnet poles further includes providing the same total number of turns on each electromagnet pole regardless of the number of windings on the magnet pole.

4. The method of claim 3 wherein said step of providing the same total number of turns on each electromagnet pole further includes varying the ratio of the number of turns on one winding to the number of turns on another winding on the same electromagnet pole for at least some of the adjacent electromagnet poles.

5. The method of claim 2 wherein said first power supply and each subsequent power supply is connected to one winding on each of five consecutive electromagnet poles.

6. The method of claim 5 including connecting said one winding on each of five consecutive electromagnet poles in series with one another and with said first power supply.

7. The method of claim 5 wherein a plurality of power supplies are connected in staggered order to one winding on each of five adjacent electromagnet poles wherein said first power supply is connected to one winding each of said first five electromagnet poles, said second power supply is connected to one winding of each of the third through seventh electromagnet poles, a third power supply is connected to one winding on each of the fifth through ninth electromagnet poles, and each succeeding power supply is similarly connected to one winding of each electromagnet pole in successive sets of five electromagnet poles in a progression by two.

8. The method of claim 7 wherein each of said power supplies connected to one winding on each of five successive electromagnet poles is connected to a winding, respectively, on said first and fifth electromagnet poles connected to that power supply equal to one-eighth of the total turns of all the windings on those electromagnet poles, each winding, respectively, on said second and fourth electromagnet poles connected to that power supply have a number of turns equal to one-half of the total turns of the windings on those electromagnet poles, and the number of turns on the winding on said third electromagnet pole connected to that same power supply is equal to three-quarters of the total number of turns of the windings on that electromagnet pole.

9. The method of claim 8 wherein the polarity of the second and fourth electromagnet poles connected to a power supply is opposite to the polarity of the first, third, and fifth electromagnet poles connected to the same power supply.

10. The method of claim 6 wherein said step of connecting each of said power supplies to one winding on each of five consecutive electromagnet poles comprises connecting said power supply to said five electromagnet poles in respective turns ratios of 1:8, 4:8, 6:8, 4:8, 1:8 and the polarity of windings on said second and fourth electromagnet poles is opposite to that of said first, third, and fifth electromagnet poles.

11. The method of claim 4 which further includes the step of connecting each power supply in series with one winding on each of seven consecutive electromagnet poles which windings are also in series with one another, the turns ratios of the windings connected in series to the same power supply on each of said seven magnet poles comprising 1:8, 4:8, 7:8, 8:8, 7:8, 4:8, 1:8; with said winding on said second, fourth, and sixth magnet poles being wound in the opposite direction to the windings on said first, third, fifth, and seventh magnet poles connected to the same power supply.

12. An improved method for adjusting the magnetic field in a wiggler generated by a plurality of electromagnet poles spaced along the path of a charged particle beam to compensate for energy losses in the charged particles which comprises:

(a) generally providing two windings on each of said electromagnet poles with the total number of turns in the combined windings on each electromagnet pole being equal;

(b) connecting in series together one of said windings on each of a group of five adjacent electromagnet poles to a first power supply;

(c) varying the number of turns on each of said group of five electromagnet poles connected in series in a binomial series of fourth order whereby the number of turns on the windings on the first and fifth magnet poles connected in series is one eight of the total number of turns on those magnet poles, the number of turns on the windings of the second and fourth magnet poles in said series connection being one half of the total number of turns on those magnet poles, and the number of turns on the third magnet pole connected in said series being three quarters of the total number of turns on that magnet pole;

(d) connecting further power supplies in staggered order to one winding on each of five adjacent electromagnet poles wherein second power supply is connected to one winding of each of third through seventh electromagnet poles, a third power supply is connected to one winding on each of the fifth through ninth electromagnet poles, and each succeeding power supply is similarly connected to one winding of each electromagnet pole in successive sets of five electromagnet poles in a progression by two; and (e) independently adjusting one power supply to independently vary the current in one of said windings on said group of five adjacent electromagnet poles;

whereby the magnetic field strength of each of said group of adjacent electromagnet poles may be changed in smaller increments.

13. An improved wiggler having means for adjusting the magnetic field generated by electromagnet poles spaced along the path of a charged particle beam to compensate for energy losses in the charged particles which comprises;

(a) a plurality of windings on at least some of said electromagnet poles in said wiggler;

(b) one of said windings on each of a group of adjacent electromagnet poles connected to a first power supply, and another winding on said electromagnet poles having more than one winding connected to a second power supply; and (c) means for independently adjusting one power supply to independently vary the current in one of said windings on a group of adjacent electromagnet poles;

whereby the magnetic field strength of a group of adjacent electromagnet poles in said wiggler may be changed in smaller increments.

14. The wiggler structure of claim 13 wherein said power supplies are connected in staggered order in series with one winding on each of five adjacent electromagnet poles wherein said first power supply is connected to one winding each of a first group of five adjacent electromagnet poles, said second power supply is connected to one winding of each of a second group of five adjacent electromagnet poles commencing with the third electromagnet pole in said first group, a third power supply is connected to one winding on each of a third group of five adjacent electromagnet pole commencing with the fifth electromagnet pole in said first group, and each succeeding power supply is similarly connected to one winding of each electromagnet pole in successive groups of five electromagnet poles in a progression by two.

15. The structure of claim 14 wherein each of said power supplies connected to one winding on each of five successive electromagnet poles is connected to a winding, respectively, on said first and fifth electromagnet poles connected to that power supply equal to one-eighth of the total turns of all the windings on those electromagnet poles, each winding, respectively, on said second and fourth electromagnet poles connected to that power supply, have a number of turns equal to one-half of the total turns of the windings on those electromagnet poles, and the number of turns on the winding on said third electromagnet pole connected to that same power supply is equal to three-quarters of the total number of turns of the windings on that electromagnet pole.

16. The structure of claim 15 wherein the polarity of the second and fourth electromagnet poles connected to a power supply is opposite to the polarity of the first, third, and fifth electromagnet poles connected to the same power supply.

17. The structure of claim 14 wherein said power supplies each connected to one winding on each of five consecutive electromagnet poles are each, respectively, connected to windings on said five electromagnet poles which are provided in respective turns ratios of 1:8, 4:8, 6:8, 4:8, 1:8 and the polarity of windings on said second and fourth electromagnet poles is opposite to that of said first, third, and fifth electromagnet poles.

18. The structure of claim 13 which further includes each power supply connected in series with one winding on each of seven consecutive electromagnet poles, which windings are also in series with one another, and the turns ratios of the windings connected in series to the same power supply on each of said seven magnet poles comprise 1:8, 4:8, 7:8, 8:8, 7:8, 4:8, 1:8; with said winding on said second, fourth, and sixth magnet poles being wound in the opposite direction to the windings on said first, third, fifth, and seventh magnet poles connected to the same power supply.

* * * * *